United States Patent

Berke

[11] Patent Number: 5,940,187
[45] Date of Patent: Aug. 17, 1999

[54] METHOD FOR CERTIFYING FACSIMILE COMMUNICATIONS OVER A TELEPHONE NETWORK

[75] Inventor: Lawrence R. Berke, Dunwoody, Ga.

[73] Assignee: BellSouth Corporation, Atlanta, Ga.

[21] Appl. No.: 08/779,038

[22] Filed: Jan. 6, 1997

[51] Int. Cl.⁶ .................................................... H04N 1/00
[52] U.S. Cl. ......................... 358/434; 358/400; 358/402; 358/407
[58] Field of Search ................................... 358/400–407, 358/439, 434, 435, 442; 379/100.06–100.08, 93.07, 88.01, 67.1; 380/23, 16–18, 30; 235/380; 370/389

[56] References Cited

U.S. PATENT DOCUMENTS

| | | | |
|---|---|---|---|
| 3,896,266 | 7/1975 | Waterbury | 235/380 |
| 4,941,170 | 7/1990 | Herbst | 379/100.07 |
| 4,994,926 | 2/1991 | Gordon et al. | 358/400 |
| 5,146,348 | 9/1992 | Kaneyama | 358/407 |
| 5,181,238 | 1/1993 | Medamana et al. | 379/93.03 |
| 5,222,138 | 6/1993 | Balabon et al. | 380/23 |
| 5,255,106 | 10/1993 | Castro | 358/400 |
| 5,257,112 | 10/1993 | Okada | 358/402 |
| 5,291,302 | 3/1994 | Gordon et al. | 358/400 |
| 5,339,361 | 8/1994 | Schwalm et al. | 380/23 |
| 5,430,719 | 7/1995 | Weisser, Jr. | 370/389 |
| 5,432,618 | 7/1995 | Monnot et al. | 358/435 |
| 5,452,099 | 9/1995 | Von Meister | 358/403 |
| 5,493,614 | 2/1996 | Chaum | 380/30 |
| 5,566,230 | 10/1996 | Cairo | 379/93.07 |
| 5,692,048 | 11/1997 | Gormish et al. | 380/18 |

FOREIGN PATENT DOCUMENTS

| | | |
|---|---|---|
| 0 624 971 A1 | 11/1994 | European Pat. Off. . |
| 63-181565 | 7/1988 | Japan . |
| 07028901 | 1/1995 | Japan . |

OTHER PUBLICATIONS

Graeme J. Proudler, "2244 Research Disclosure," Feb., 1994, No. 358, Emsworth, GB.

*Primary Examiner*—Leo H. Boudreau
*Assistant Examiner*—Ishrat Sherali
*Attorney, Agent, or Firm*—Jones & Askew, LLP

[57] ABSTRACT

A system and method facilitate certified facsimile communication over a telephone network between a plurality of originators of facsimile messages and at least one receiver of facsimile messages. The method includes a registration sequence during which an originator of facsimile messages establishes an account with the certifying system by providing a handwritten signature and identifying data. The handwritten signature is linked to the identifying data, and the identifying data is utilized through the method in an effort to insure the authenticity of facsimile messages certified by the certifying system. The method also includes an initial delivery sequence at which time a document control number is established for a facsimile message that an originator wants to transmit to a receiver. The method further includes a final delivery sequence, at which time the originator transmits the facsimile message with the document control number thereon to the certifying system. The certifying system verifies the document control number and identifying data. Then, the certifying system appends a reproduction of the originator's handwritten signature, a confirmation number, and other information that supports the authenticity of the facsimile message to the facsimile message, and forwards the facsimile message to the receiver. The method further includes a confirmation sequence, at which time the originator is provided with the confirmation number. The receiver can compare the reproduction of the handwritten signature appended to the facsimile message to any handwritten signature original on the facsimile message and call the originator and ask for the confirmation number for authentication purposes.

16 Claims, 11 Drawing Sheets

*Certi-Fax* Registration Form

Instructions:

1) Sign your full legal name in the Signature Box Below.

2) Call 1-800- .......... and respond to the prompts.

Signature Box

*Jonathan E. Doe*

Sworn to and subscribed before me, this 19TH day of SEPTEMBER, 1999

RICHARD M. SMITH
Notary Public

My Commission Expires: 10/10/2001

*Richard M. Smith*
Signature

METHOD FOR CERTIFYING FACSIMILE COMMUNICATIONS OVER A TELEPHONE NETWORK

FIELD OF THE INVENTION

This invention relates generally to the field of telecommunications and more particularly to systems for delivering certified facsimile messages.

BACKGROUND OF THE INVENTION

People frequently transmit documents between facsimile machines because communicating by facsimile is quick and convenient. However, for security reasons it is common to confirm the authenticity of a facsimiled document by subsequently delivering the original copy of the document to the receiver. The use of confirmation copies is particularly common in the case of legal documents or other documents upon which a person's signature is affixed. The facsimile copy is often sent because it will be received quickly. The original document is then additionally sent because the original provides greater assurance to the receiver that the signature affixed thereto is authentic. Because resources must be expended to follow the facsimile copy up with the original copy, it is desirable to enhance the security of facsimile transmissions so that the need to send original copies is diminished.

Efforts have been made to increase the security of telecommunications generally, and facsimile communications more specifically. U.S. Pat. No. 5,432,618 discloses a method for certifying messages sent by facsimile. In accordance with this method, an originator at an originating facsimile machine places an alphanumeric indicia at a first preselected spot on a sheet that is to be sent by facsimile. When that sheet is transmitted by the originating facsimile machine, a certifying device connected to the originating facsimile machine encrypts at least a portion of the alphanumeric marking to create a seal. The facsimile message received by a receiver at a receiving facsimile machine includes the seal at a second preselected spot as well as the original alphanumeric marking at the first preselected spot. A second certifying device that is connected to the receiving facsimile machine encrypts the seal to create an encrypted acknowledgment of receipt that is sent to the originating facsimile machine.

The encryption algorithms are carried upon cards that are inserted into the certifying devices. An Information Retrieval Center knows the encryption algorithms assigned to the originator and the receiver. Therefore, when the receiver provides the Information Retrieval Center with the alphanumeric marking at the first preselected spot, the seal at the second preselected spot, and the name of the user of the originating facsimile machine, the Information Retrieval Center can encrypt the alphanumeric marking with the encryption algorithm assigned to the originator to create a seal. If the seal created by the Information Retrieval Center is identical to the seal at the second preselected spot on the facsimile message, then the Information Retrieval Center gives an official authentication of the message. The originator can similarly provide the Information Retrieval Center with the encrypted acknowledgment to receive an official authentication that the message was received by the intended receiver.

U.S. Pat. No. 3,896,266 discloses a method for remotely authorizing credit card purchases that incorporates facsimile messages. A credit card has encoded thereon voice characteristics of the owner of the credit card. When the owner uses a credit card to make purchases over the telephone network, the owner calls an authenticating system and passes the credit card through a reader that decodes and transmits the voice characteristics over the phone line. The authenticating system compares the decoded voice characteristics to the caller's voice characteristics to verify that the user of the card is the owner of the card. Once this is verified, the card utilization system sends a document by facsimile to the owner of the card. The owner signs the document and facsimiles it to the card utilization system to complete the transaction.

U.S. Pat. No. 5,291,302 discloses a store and forward facility for receiving a facsimile message from an originating facsimile machine and forwarding the facsimile message to a receiving facsimile machine. Alternatively, the facsimile message is stored in a storage mailbox. The user of the receiving facsimile machine can retrieve the facsimile message from the storage mailbox 20 only by submitting a proper security number to the store and forward facility. Similarly, U.S. Pat. No. 5,181,238 discloses a system for preventing unauthorized access to services provided over a telephone network. The system requires the entry of a proper security number prior to providing access to services.

While the prior art methods and systems seek to provide secure telecommunications, including certified facsimile messages, the level of security and certification provided by those methods and systems is limited. For example, for certain of those methods and systems, if an unauthorized individual gains access to security numbers or encryption algorithms, security can be breached. Additionally, it is believed that the prior art methods and systems have done little to address the perceived need to provide a receiver of certain signed documents with both the original document and a facsimile copy of the document. There is therefor a need for an improved system for certifying facsimile messages.

SUMMARY OF THE INVENTION

The present invention includes a certifying system that certifies facsimile messages transmitted between originators of facsimile messages and receivers of facsimile messages.

The communication between the certifying system and the originators and receivers is preferably carried out over a telephone network. The system receives a facsimile message from an originator, identifies the originator, and transmits the facsimile message and certifying indicia that corresponds to the originator to the intended receiver. The certifying indicia is preferably a reproduction of the handwritten signature of the originator. Therefore, the receiver can compare the reproduction of the handwritten signature to a handwritten signature original on the facsimile message for authentication purposes.

More specifically described, the present invention provides a system and method for facilitating certified facsimile communication over a telephone network between a plurality of originators of facsimile messages and at least one receiver of facsimile messages. The method includes a registration sequence during which an originator of facsimile messages establishes an account with the certifying system by providing certifying indicia (e.g., a handwritten signature) and identifying data (e.g., passwords and voiceprints) to the certifying system. The handwritten signature is linked to the identifying data, and the identifying data is utilized throughout the method in a manner that seeks to insure the authenticity of facsimile messages certified by the certifying system. The method also includes an initial delivery sequence at which time a document control indicia (e.g., document control number) is established for a facsimile message that an originator desires to transmit to a receiver. The method further includes a final delivery sequence, at which time the originator transmits the facsimile message to the certifying system and the certifying system appends the reproduction of the originator's handwritten signature, a confirmation number, and other information that supports the authenticity of the facsimile message to the facsimile message, and forwards the facsimile message to the receiver. The method further includes a confirmation sequence, at which time the originator is provided with the confirmation number. The receiver can compare the reproduction of the handwritten signature appended to the facsimile message to any handwritten signature original on the facsimile message and call the originator and ask for the confirmation number for authentication purposes.

The certifying system completes the registration sequence for each originator of facsimile messages that desires to use the certifying system. For each originator, the certifying system receives identifying data and a facsimile message that includes the handwritten signature of the originator. The identifying data is stored in a memory, and the handwritten signature is extracted from the facsimile message, stored in the memory, and linked to the identifying data.

The certifying system completes an initial delivery sequence for each facsimile message that an originator desires to have certified by the certifying system. Subsequent to receiving and verifying identifying data, the certifying system generates or receives from the originator a document control number that is stored in the memory and linked to the identifying data and handwritten signature that were previously stored in the memory for the originator. Also, the inception of each document control number is noted, because each document control number is valid for only a limited period of time.

The certifying system completes a final delivery sequence in response to receiving a facsimile message that includes a previously established document control number. The certifying system scans and extracts the document control number from the facsimile message, and verifies that the extracted document control number is still valid. Alternatively or additionally, the originator of the facsimile message can enter the document control number by way of a touch-tone entry. In addition to receiving a facsimile message and a valid document control number, the certifying system must additionally receive from the originator of that facsimile message some identifying data, and verify that identifying data. Subsequent to those two verifications, the reproduction of the handwritten signature that corresponds to the received identifying data and document control number are appended to the facsimile message. Additionally, the certifying system generates a confirmation number originally unknown to the originator and the receiver. The confirmation number is also appended to the facsimile message. The facsimile message, which includes the appended data, is then transmitted to the receiver.

Lastly, the certifying system completes a confirmation sequence, at which time the originator is provided with the confirmation number. In some of the embodiments of the present invention, the certification system provides the confirmation number to the originator subsequent to the transmission of the facsimile message which includes the appended data. The certifying system receives a call from the originator and provides the confirmation number to the originator subsequent to receiving the proper identifying data and document control number from the originator. In some of the embodiments of the present invention, the confirmation sequence is carried out as part of the final delivery sequence. For example, the certifying system can automatically generate and transmit to the originator a confirmation facsimile message that includes the confirmation number. Alternatively, the certifying system can audibly provide the originator with the confirmation number subsequent to receiving identifying data from the originator during the final delivery sequence.

Thus, it is an object of the present invention to provide an improved system for delivering certified facsimile messages.

Another object of the present invention is to assure receivers of facsimile messages that the indicated originators of the facsimile messages are truly the originators.

Still another object of the present invention is to provide certified signatures by facsimile.

Still another object of the present invention is have an authentic reproduction of a handwritten signature conveyed by a third party so that a receiver of a facsimile message can compare the reproduction of the handwritten signature to a signature original on the facsimile message for authenticating purposes.

Other objects, features, and advantages of the present invention will become apparent upon review of the following description of embodiments and the appended drawings and claims.

DETAILED DESCRIPTION

Figure 1:
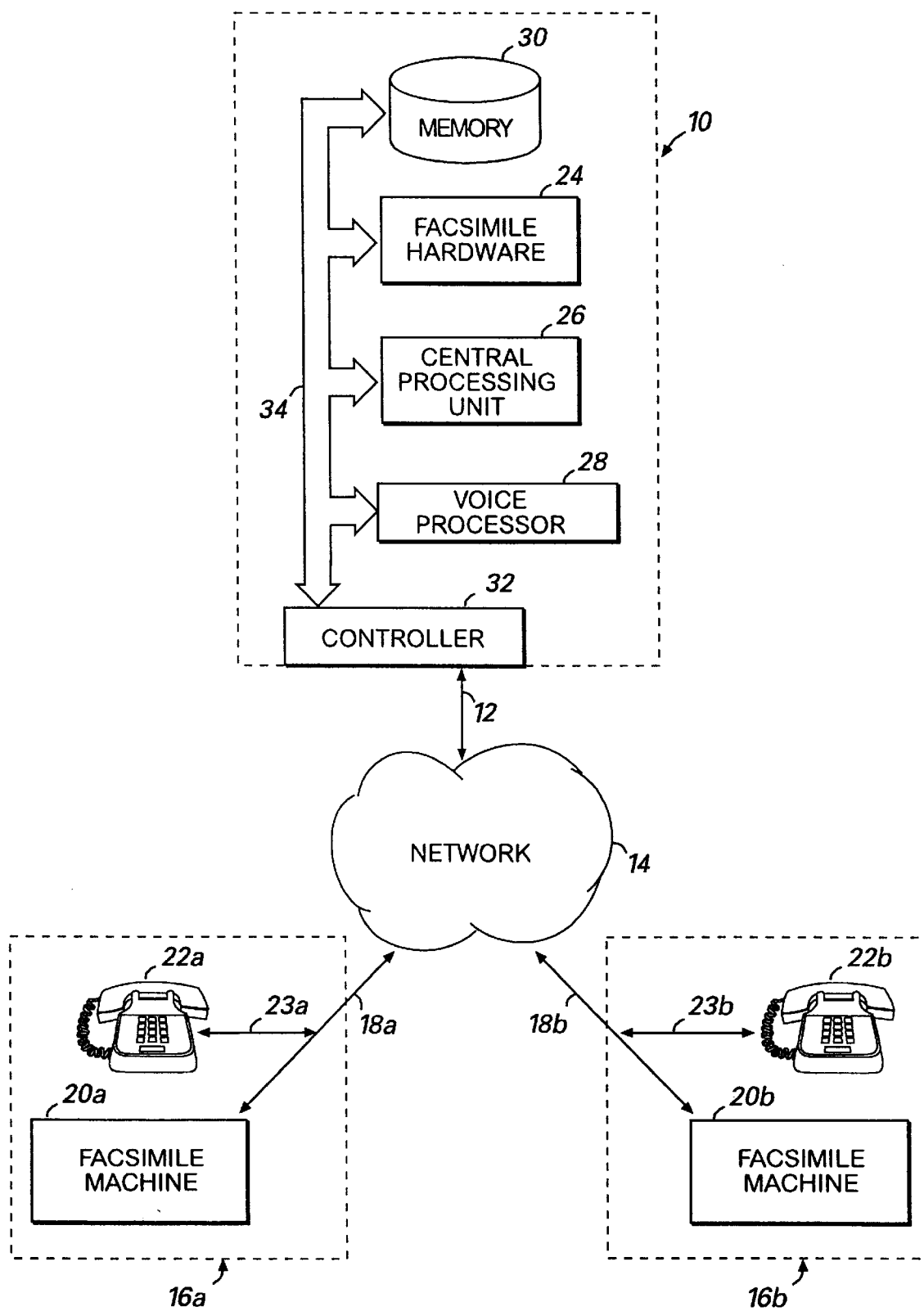
FIG. 1 is a block diagram of a system for delivering certified facsimile messages, in accordance with an exemplary embodiment of the present invention.

Turning now to the drawings in which like numbers reference like parts or steps, in the several figures, FIG. 1 is a block diagram of a certifying system 10 for delivering certified facsimile messages, in accordance with an exemplary embodiment of the present invention. As discussed in greater detail below, the certifying system 10 receives a first facsimile message from an originator of a facsimile message, identifies the originator, and then transmits the facsimile message and certifying indicia that corresponds to the originator to the intended receiver of the facsimile message.

The certifying system 10 communicates with a plurality of telecommunication stations 16 by way of a telecommunications network 14. The network 14 is acceptably any type of telecommunications network, but is preferably the Advanced Intelligent Network. The Advanced Intelligent Network is disclosed in U.S. Pat. No. 5,430,719, which is expressly incorporated herein by reference, in its entirety. The certifying system 10 communicates with the telecommunications network 14 by way of a transmission path 12. The telecommunication stations 16 communicate with the network 14 by way of transmission paths 18. Each of the telecommunications stations 14 is depicted as being equipped with a facsimile machine 20. Each of the facsimile machines 20 is capable of transmitting and receiving facsimile messages, and is also preferably capable of establishing touch-tone and other telephone-like communications with the network 14. Alternatively, the telephone communications can be facilitated by way of telephone sets 22 and transmission paths 23. The telecommunication stations 16 can alternatively include any type of equipment that is capable of carrying out the discussed functions of the telecommunication stations 16.

The certifying system 10 is preferably capable of contemporaneously receiving facsimile messages from and transmitting facsimile messages to a multiplicity of telecommunication stations 16, and certifying each of those facsimile messages. Nonetheless, for the sake of explanation, one of the telecommunication stations 16 depicted in FIG. 1 is referred to hereafter as originating station 16a, and the other is referred to hereafter as receiving station 16b. Additionally, for the sake of explanation the certifying system 10 is discussed primarily in the context of receiving a facsimile message sent from the originating station 16a, certifying that facsimile message, and transmitting it to the receiving station 16b.

The certifying system 10 is preferably an improved computerized store and forward facility that includes all of the capabilities of conventional store and forward facilities, plus the improvements disclosed herein. The certifying system 10 includes facsimile hardware 24 capable of converting facsimile transmissions into two-dimensional binary maps (i.e., bit mapping) and vice versa, and extracting (i.e., excerpting or "cutting") elements from and inserting (i.e., "pasting") elements into a facsimile message. The capabilities of a voice processor 28 include creating "voice prints," which are distinctive patterns of voice characteristics that can be used to distinguish one person's voice from other voices. The voice processor 28 also has voice recognition capabilities so that it can convert spoken words (e.g., verbal instructions or data) or related telephone signals into signals for a central processing unit 26. A memory 30 provides for storage and retrieval of data. A controller 32 functions as a switching mechanism that establishes and terminates communications with the network 14 by way of the transmission path 12. The controller 32 also converts telephone signals into signals for the central processing unit 26. The central processing unit 26 executes computer code and cooperates with the other components of the certifying system 10 to carry out the methods of the present invention, which are discussed in detail below. A bus 34 provides a communication path between the components of the certifying system 10.

Figure 2:
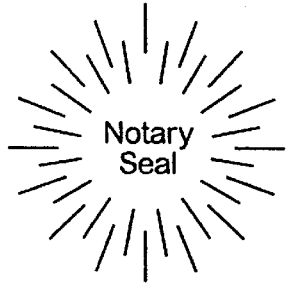
FIG. 2 is an illustration of a registration form that is received by the certifying system.

An originator of facsimile messages preferably registers to use the certifying system 10. FIG. 2 is an illustration of an exemplary registration form 36 that can be used in the registration process. The registration form 36 includes an indicia box 38 (e.g., signature box 38) within which the originator places certifying indicia 40 such as his or her handwritten signature 40. In accordance with the exemplary embodiment of the present invention, the originator signs within the signature box 38 of the registration form 36 in the presence of a reliable witness such as a notary public or bank employee that compares the handwritten signature 40 to a signature on a driver's license, or the like. The witness then notarizes the registration form 36 and transmits the registration form 36 to the certifying system 10, as discussed in greater detail below.

Figure 3:
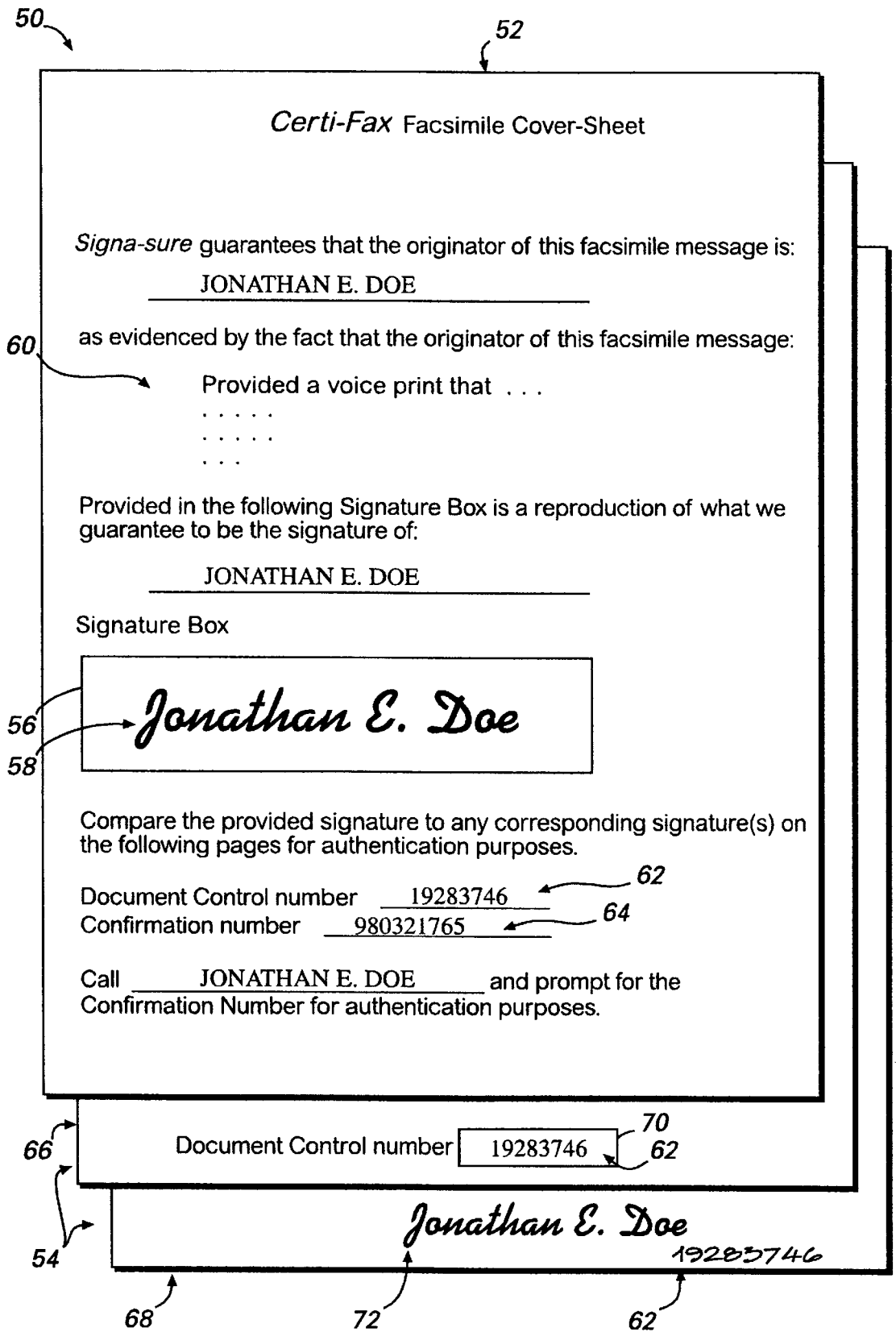
FIG. 3 is an illustration of a certified facsimile message that has been transmitted by the certifying system and printed, wherein the pages of the facsimile message are overlapping.

FIG. 3 is an illustration of an exemplary certified facsimile message 50 that has been transmitted from the certifying system 10 to the receiving station 16b, and printed. The pages of the certified facsimile message 50 are illustrated in an overlapping arrangement. The certified facsimile message 50 includes an exemplary cover sheet 52 that was generated by the certifying system 10 and an exemplary facsimile message 54 that was transmitted from the originating station 16a to the certifying system 10. As discussed in greater detail below, the originator of the facsimile message 54 transmitted the facsimile message 54 to the certifying system 10, and the certifying system 10 appended the cover sheet 52 to the facsimile message 54 to create the certified facsimile message 50.

The cover sheet 52 includes an indicia box 56 (e.g., signature box 56) and an indicia reproduction 58 (i.e., signature reproduction 58). The signature reproduction 58 is a reproduction of the handwritten signature 40 (FIG. 2), as will be discussed in greater detail below. The cover sheet 52 further includes a list 60 of the types of identifying data that the originator of the facsimile message 54 provided to the certifying system 10 in the furtherance of having the certifying system certify the facsimile message 54, as will be discussed in greater detail below. The cover sheet 52 further includes document control indicia 62 (e.g., document control number 62) and confirmation indicia 64 (e.g., confirmation number 64), both of which are discussed in greater detail below and are preferably alphanumeric.

The facsimile message 54 includes an exemplary cover sheet 66 and an exemplary following sheet 68. As discussed in greater detail below, in accordance with the exemplary embodiment of the present invention, the originator of the facsimile message 54 received the cover sheet 66 from the certifying system 10 prior to transmitting the facsimile message 54. The cover sheet 66 includes the document control number 62 within an indicia box 70. The following sheet 68 includes a certifying indicia 72 (e.g., handwritten signature 72) and the document control number 62, which the originator wrote on the following sheet 68 prior to transmitting the facsimile message 54. While only a single following sheet 68 is depicted in FIG. 3, the facsimile message 54 can consist of solely the cover sheet 66, which would preferably additionally include the handwritten signature 72, or can additionally include a plurality of sheets 68. When there are a plurality of sheets 68, the originator preferably writes the document control number 62 on each of the sheets 66, and the handwritten signature can be on any or all of the sheets 66.

In accordance with the exemplary embodiment of the present invention, the receiver at the receiving station 16b (FIG. 1) can call the originator at the originating station 16a to authenticate the certified facsimile message 50 by asking for the confirmation number 64, as discussed in greater detail below. Also, the receiver can review the certified facsimile message 50 and compare the signature reproduction 58 to the handwritten signature 72 in a manner that authenticates the handwritten signature 72. Additionally, by reviewing the list 60 of the types of identifying data that the originator had to provide to the certifying system 10 prior to the transmitting of the certified facsimile message 50, the receiver has further assurance of the authenticity of the certified facsimile message 50.

Figure 4:
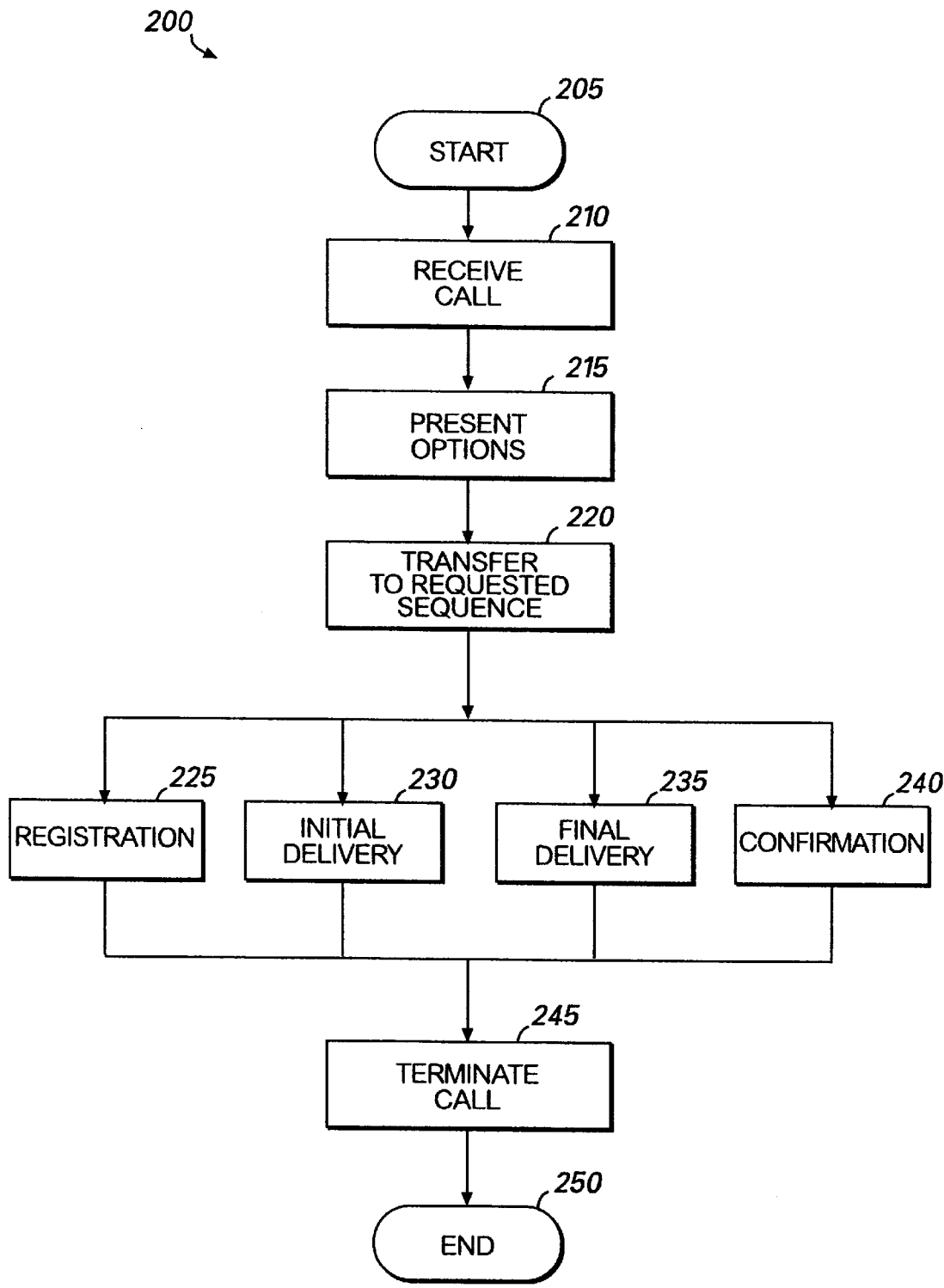
FIG. 4 is a flow diagram illustrating an exemplary method performed by the certifying system.

Turning now to FIG. 4, exemplary methods by which the certifying system 10 (FIG. 1) operates will be described. Throughout the following discussion, unless expressly indicated otherwise, the steps and methods discussed are carried out by the certifying system 10. Further, while the methods of the present invention are often discussed in the context of a single originator, receiver, and facsimile message, it should be understood that the certifying system 10 can handle numerous different originators, receivers, and facsimile messages at a single time.

FIG. 4 is a flow diagram illustrating an exemplary method 200 of operation for the certifying system 10. The method 200 begins at step 205 and proceeds to step 210. At step 210, the certifying system 10 receives a call from an originator of facsimile messages that is located, for example, at the originating station 16a (FIG. 1). At step 215, the certifying system 10 provides the originator with a plurality of options. At step 220, in response to the originator selecting one of the presented options, the method 200 proceeds to one of the steps 225, 230, 235, 240. As will be discussed in greater detail below, at the registration step 225, the originator establishes an account with the certifying system 10. The originator provides a handwritten signature 40 (FIG. 2) by way of the registration form 36 (FIG. 2) and identifying data (e.g., passwords and voice prints) are established for the originator. At the initial delivery step 230, the certifying system 10 transmits to the originator the cover sheet 66 (FIG. 3), as discussed in greater detail below. At the final delivery step 235, the originator transmits the facsimile message 54 (FIG. 3) to the certifying system 10. The certifying system 10 creates and appends the cover sheet 52 (FIG. 3) to the facsimile message 54 to create the certified facsimile message 50, which is transmitted to a receiver at the receiving station 16b (FIG. 1), as discussed in greater detail below. At step 240, the originator is provided with the confirmation number 64 (FIG. 3), as discussed in greater detail below. Subsequent to each of the steps 225, 230, 235, 240, step 245 terminates the call.

Figure 5:
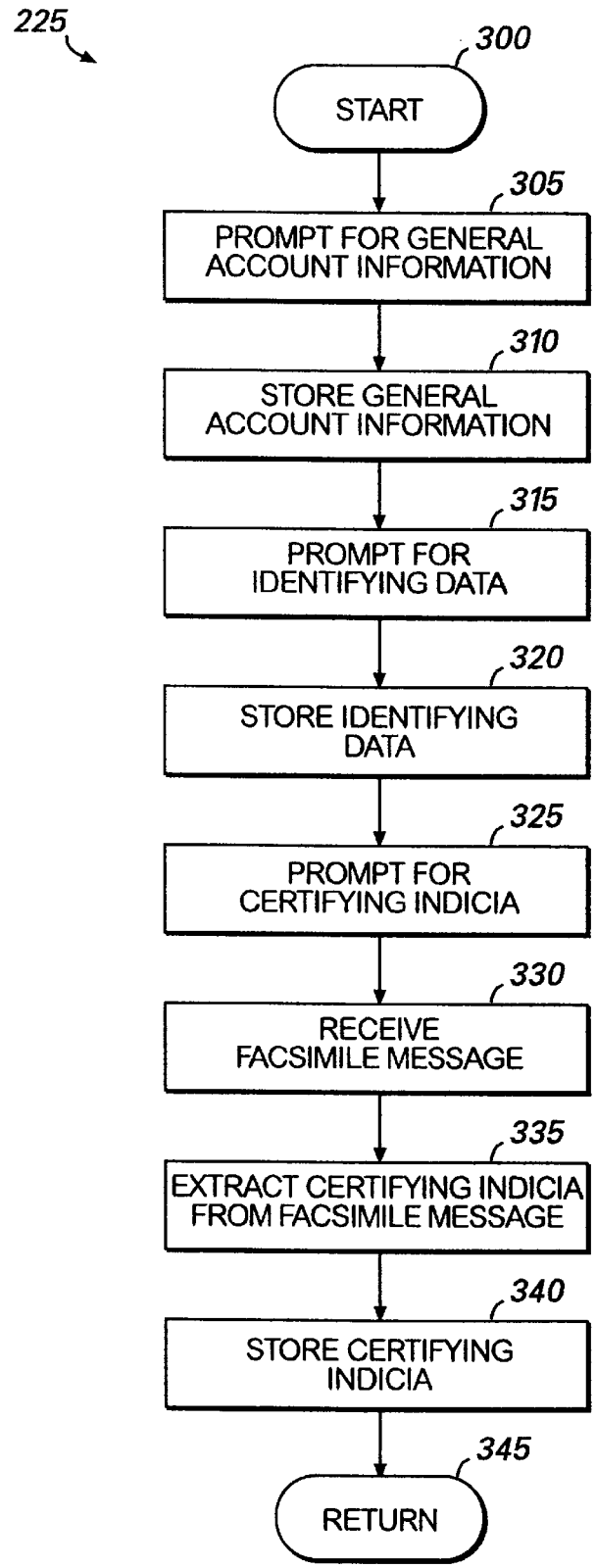
FIG. 5 is a flow diagram illustrating an exemplary method for registering a user, which forms a part of the method of FIG. 4.

FIG. 5 is a flow diagram illustrating an exemplary registration method 225 for carrying out the registration step 225 of FIG. 4. The method 225 begins at step 300 and proceeds to step 305. At step 305, the certifying system 10 (FIG. 1) prompts the originator for general account information. For example, the general account information can include a billing address and payment method. At step 310, the certifying system 10 stores the general account information in the memory 30 (FIG. 1). At step 315, the certifying system 10 prompts the originator for a plurality of identifying data. For example, the identifying data can include one or more of the following: a social security number, personal identification number, other numbers, names, or other words, and the like. The certifying system 10 can require that some or all of the foregoing identifying data be spoken by the originator.

The certifying system can store spoken identifying data in the form of "voice prints." The certifying system 10 can also require that some or all of the foregoing identifying data be provided by way of a conventional touch-tone keypad on either a facsimile machine 20 (FIG. 1) or a telephone set 22 (FIG. 1). It is preferable for the certifying system 10 to have and utilize voice print and "touch-tone" identifying data for each originator. At step 320, the identifying data is stored in the memory 30.

At step 325, the certifying system 10 prompts the originator to transmit a completed registration form 36 (FIG. 2) to the certifying system 10. As mentioned previously, in accordance with the exemplary embodiment of the present invention, the originator signs the registration form 36 in the presence of a reliable witness such as a notary public or bank employee that compares the handwritten signature 40 (FIG. 2) to a signature on a driver's license or the like, and then notarizes the registration form 36 and transmits the registration form 36 to the certifying system 10 for the originator. At step 330, the certifying system 10 receives the registration form 36 as a facsimile message. At step 335, the certifying system 10 extracts the handwritten signature 40 from the registration form 36. In accordance with the exemplary embodiment of the present invention, the handwritten signature 40 is placed within a signature box 38 so that the certifying system 10 can readily locate the handwritten signature 40 and extract the signature 40 from the registration form 36. In accordance with another embodiment, a signature box 38 is not provided, but in that embodiment it is preferable to locate the handwritten signature 40 at a predetermined location on the registration form 36 so that the handwritten signature 40 can be readily located by the certifying system 10 and extracted from the registration form 36. At step 340, an image of the handwritten signature 40 is stored in the memory 30. The handwritten signature 40 is linked to the identifying data stored at step 320. At step 345, the method 225 returns to step 245 (FIG. 4) of method 200 (FIG. 4) and terminates the call. The certifying system 10 performs the registration method 225 for each sender of facsimile messages that registers with or subscribes to use the certifying system 10. Therefore, the memory 30 includes a plurality of identifying data and a plurality of handwritten signature 40. Each handwritten signature 40 is linked to the identifying data that it was received with.

Figure 6:
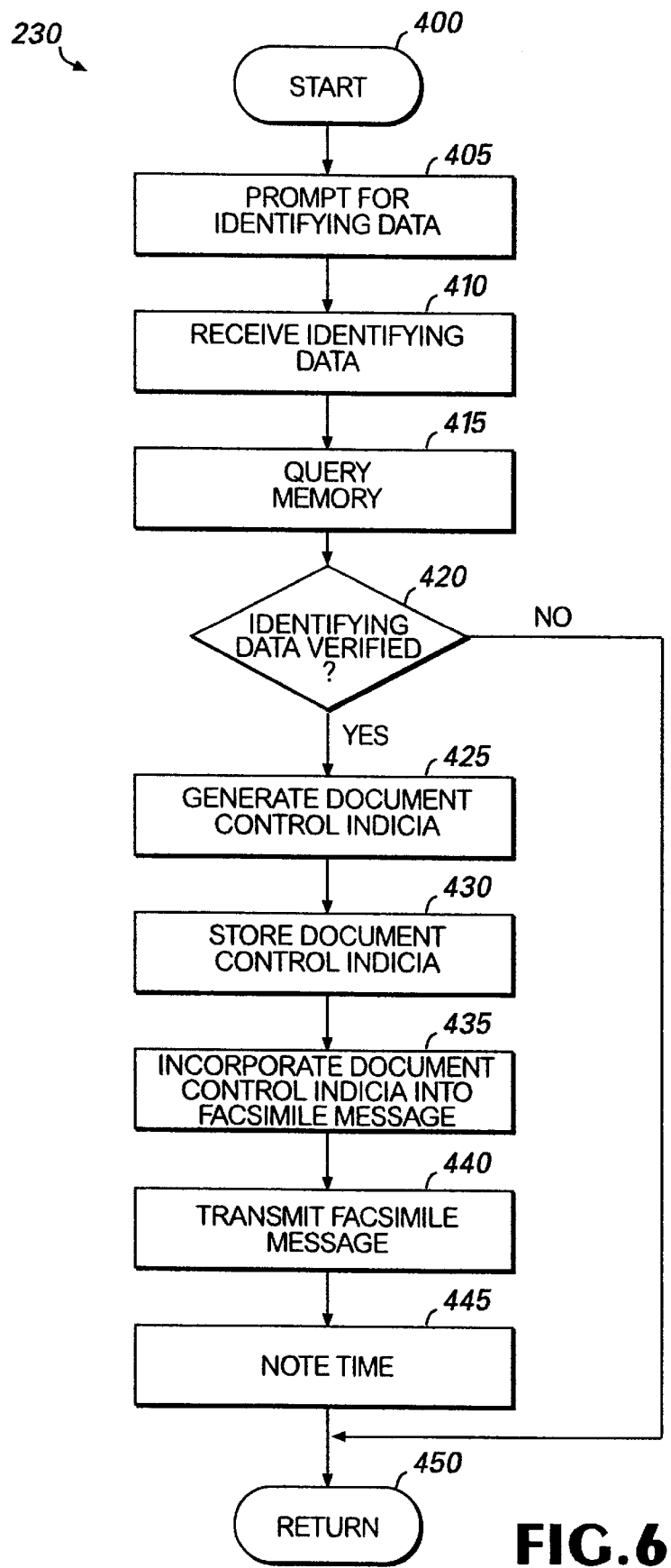
FIG. 6 is a flow diagram illustrating an exemplary method for initiating delivery of a certified facsimile message, which forms a part of the method of FIG. 4.

FIG. 6 is a flow diagram illustrating an exemplary method 230 for carrying out the initial delivery step 230 in FIG. 4. The initial delivery method 230 provides a registered user with the cover sheet 66. The initial delivery method 230 begins at step 400 and proceeds to step 405. At step 405, the certifying system 10 prompts the originator for one or a plurality of identifying data. At step 410, the certifying system 10 receives the identifying data from the originator. At step 415, the memory 30 is queried for identifying data previously stored in the memory 30. At step 420, the certifying system 10 compares the identifying data received at step 410 to the identifying data previously stored in the memory 30 to verify that the identifying data received at step 410 was previously stored in memory 30. In response to a negative verification at step 420, the method 230 proceeds to step 450, where it returns to step 245 (FIG. 4) of method 200 (FIG. 4) and terminates the call. In response to a positive verification at step 420, the method 230 proceeds to step 425. At step 425, the certifying system 10 generates a document control number 62 (FIG. 3). Preferably a different document control number 62 is generated each time the step 425 is executed. At step 430, the document control number 62 generated at step 425 is stored in the memory 30. The document control number 62 is linked in the memory 30 to the identifying data received at step 410. The document control number 62 is preferably considered to be one type of identifying data. At step 435, the cover sheet 66 (FIG. 3) is created and the document control number 62 generated at step 425 is inserted into the indicia box 70. At step 440, the cover sheet 66 (FIG. 3) is transmitted to the originator. At step 445, the time is noted, and the noted time is linked to the document control number 62. The document control number 62 is valid for a limited period of time subsequent to step 425. At step 450, the method 230 returns to step 245 (FIG. 4) of method 200 (FIG. 4).

In accordance with certain embodiments of the present invention, the initial delivery method 230 is varied from that which is illustrated in FIG. 6. For example, in accordance with one embodiment of the present invention, the document control number 62 is provided by the originator to the certifying system 10 at step 425, rather than being generated by the certifying system 10. As an additional example, in accordance with another embodiment of the present invention, step 440 is not performed and the certifying system 10 provides the document control number 62 to the originator in an audible form, for example by way of a telephone set 22. In accordance with that embodiment, the originator writes the document control number 62 in the indicia box 70 (FIG. 3) of a previously provided cover sheet 66 (FIG. 3).

Figure 7A:
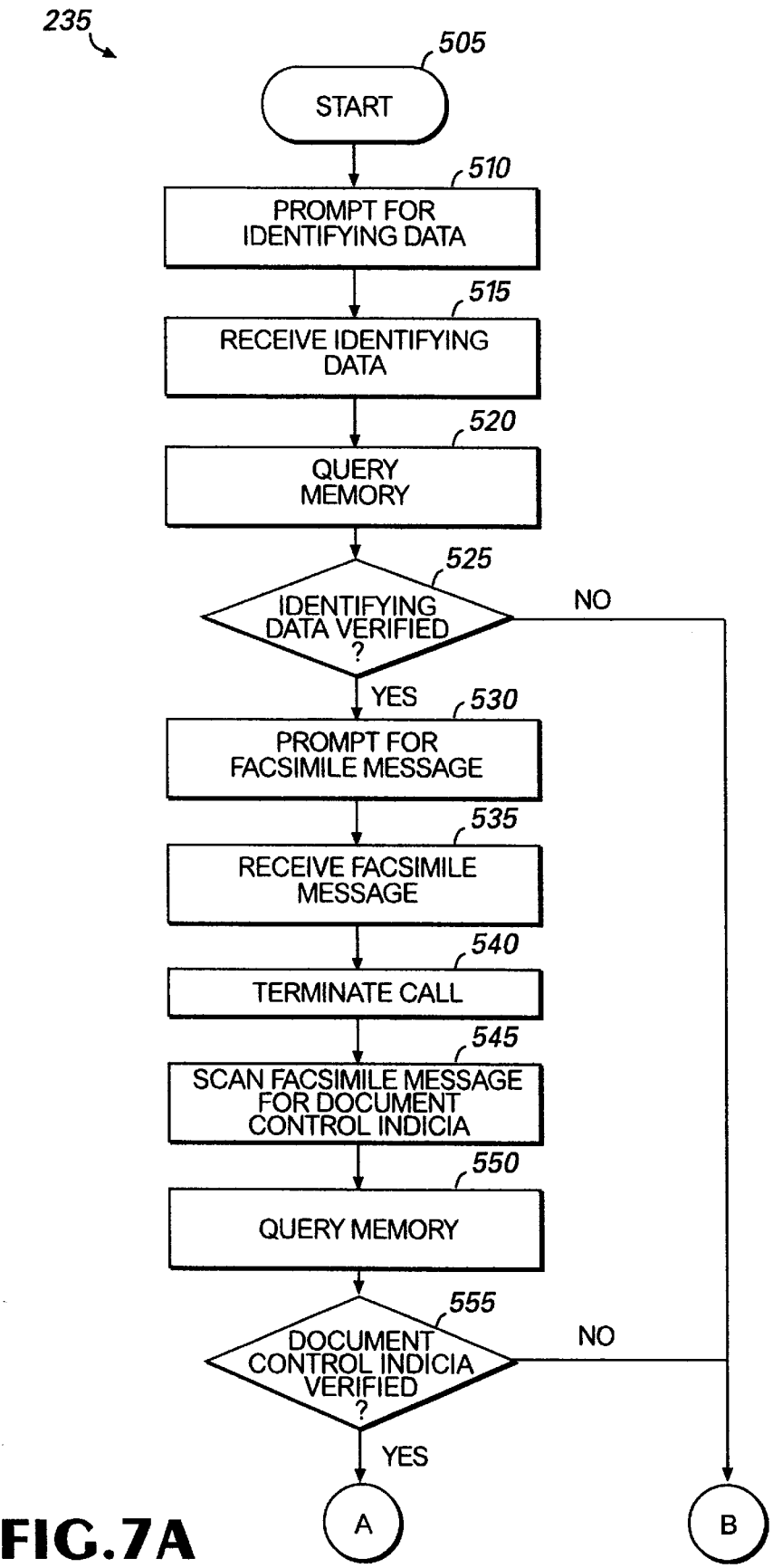
FIGS. 7A–7B are a flow diagram that illustrates an exemplary method for completing delivery of a certified facsimile message, which forms a part of the method of FIG. 4.
Figure 7B:
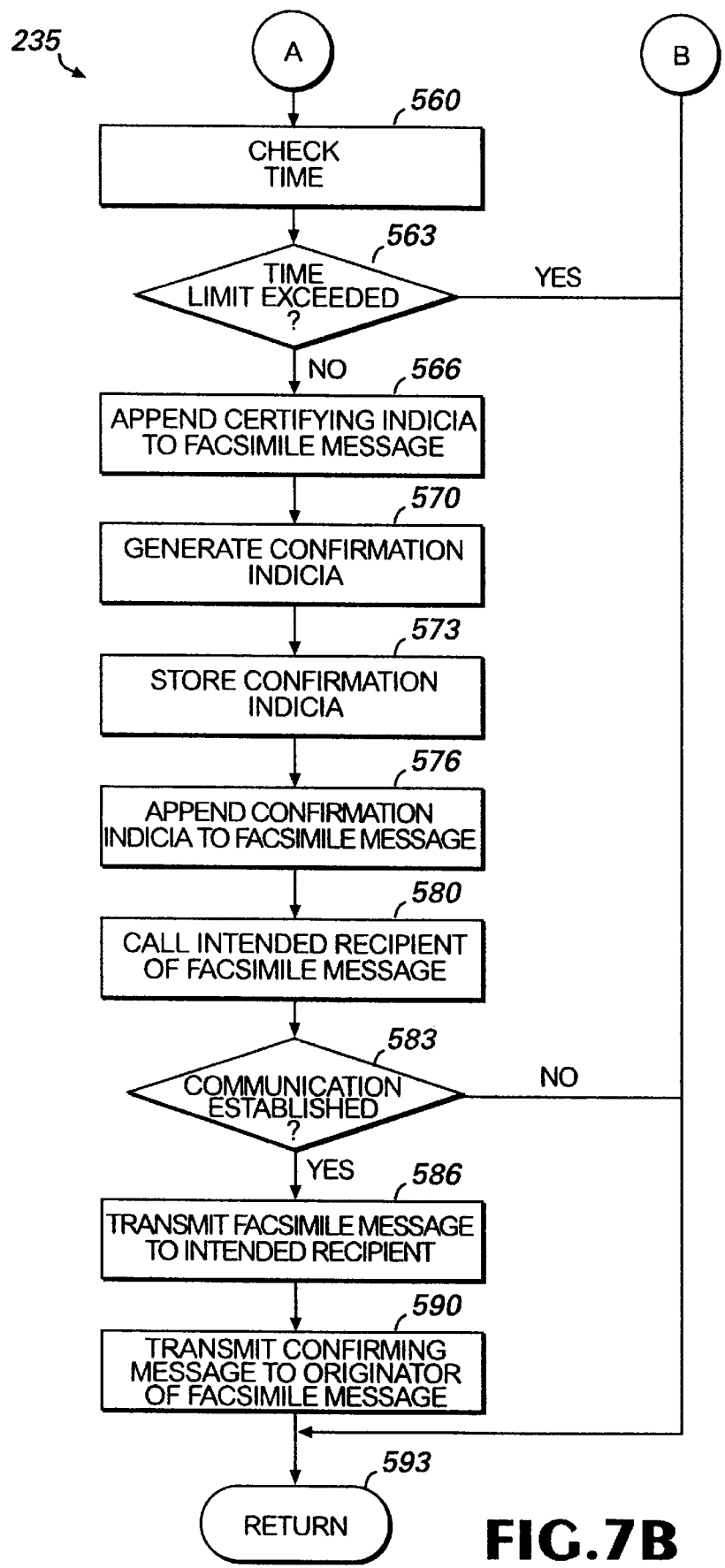

FIGS. 7A–7B are flow diagrams that illustrate an exemplary method 235 for carrying out the final delivery step 235 of FIG. 4. The final delivery method 235 includes steps 505–593. At step 510, the certifying system 10 prompts the originator for one or more identifying data. At step 515, the certifying system 10 receives the identifying data from the originator. At step 520, the memory 30 is queried for identifying data previously stored in the memory 30. At step 525, the certifying system 10 compares the identifying data received at step 515 to the identifying data previously stored in the memory 30 to verify that the identifying data received at step 515 was previously stored in the memory 30. In response to a negative verification at step 525, the method 235 proceeds to step 593. At step 593, the method 235 returns to step 245 (FIG. 4) of method 200 (FIG. 4). In response to a positive verification at step 525, the method 235 proceeds to step 530.

At step 530, the certifying system 10 prompts the originator to transmit the facsimile message 54 (FIG. 3) to the certifying system 10. At step 535, the certifying system 10 receives the facsimile message 54 (FIG. 3) that was transmitted by the originator. At step 540, the certifying system 10 terminates the call with the originator. At step 545, the certifying system 10 scans the facsimile message 54 and extracts the document control number 62 (FIG. 3) from the facsimile message 54. The cover sheet 66 (FIG. 3) preferably includes the indicia box 70 (FIG. 3) because the indicia box 70 will help to distinguish the document control number 62 from other indicia on the cover sheet 66. In accordance with other embodiments of the present invention, the indicia box 70 is not included, but the document control number 62 is preferably located at a predetermined location on the cover sheet 66 so that the document control number 62 can be readily located on and extracted from the cover sheet 66. In accordance with an alternative exemplary embodiment, the step 545 is not included, and the document control number 62 is prompted for and received by the certifying system 10 at a point in time prior to step 550. For example, the document control number 62 can be prompted for at step 510 and received at step 515.

At step 550, the memory 30 is queried for document control numbers 62 previously stored in the memory 30. At step 555, the certifying system 10 compares the document control number 62 received at step 545 (or received at step 515, in accordance with the alternative exemplary embodiment) to the document control numbers 62 previously stored in the memory 30 to verify that the document control number 62 received at step 545 (or received at step 515, in accordance with the alternative exemplary embodiment) was previously stored in memory 30. In response to a negative verification at step 555, the method 235 proceeds to step 593. At step 593, the method 235 returns to step 245 (FIG. 4) of method 200 (FIG. 4). In response to a positive verification at step 555, the method 235 proceeds to step 560.

At step 560, the time is noted and compared to the time that was noted at step 445 (FIG. 6) in order to determine the amount of time that has elapsed since the document control number 62 extracted at step 545 was generated at step 425 (FIG. 6). If the pre-established time limit for the document control number 62 has expired, the method 235 proceeds to step 593. If the time limit has not expired, the method 235 proceeds to step 566. At step 566, the certifying system 10 generates the cover sheet 52 (FIG. 3). The cover sheet 52 is created from the information (e.g., the signature reproduction 58 (FIG. 3)) stored in memory 30 that has been linked to the identifying data received at step 515 and/or the document control number 62 received at step 545.

At step 570, confirmation number 64 is created by the certifying system 10. The confirmation number 64 is acceptably created by an algorithm that generates random numbers, or the like. The confirmation number 64 is unknown to the originator of the facsimile message 54 (FIG. 3) or the receiver of the certified facsimile message 50 at the time it is generated, and preferably a different confirmation number 64 is generated each time step 570 is executed. At step 573, the confirmation number 64 is stored in memory 30 and linked to the identifying data received at step 515 and/or the document control number 62 received at step 545. At step 576, the confirmation number 64 is added to the cover sheet 52.

At step 580, the certifying system 10 attempts to establish communication with the receiver, for example at the receiving station 16b (FIG. 1). Each time an originator transmits a facsimile message 54 (FIG. 3) to the certifying system 10, the originator preferably identifies the desired destination for the facsimile message and the certifying system 10 notes the desired destination in a conventional manner. Alternatively the desired destination of the facsimile message 54 can be entered by the originator at step 410 (FIG. 6) and tied to and stored with the document control number 62 (FIG. 3) generated at step 425 (FIG. 6). At step 583, a determination is made as to whether or not communication was established with the receiving station 16b. If communication was not established, step 580 is repeated until communication is established, whereby the certifying system 10 functions as a store and forward facility. If communication is established with the receiving station 16b, the certified facsimile message 50 is transmitted to the receiving station 16b at step 586. At step 590, a confirmation facsimile message is transmitted from the system to the originator at, for example, the originating station 16a (FIG. 1). In accordance with one embodiment of the present invention, the confirmation number 64 is incorporated into the facsimile message transmitted to the originator at step 590. In another embodiment of the present invention, the confirmation number 64 is not incorporated into the facsimile message of step 590. At step 593, the method 235 returns to step 245 (FIG. 4) of method 200 (FIG. 4).

In accordance with alternative embodiments of the present invention, the final delivery method 235 is varied from that which is discussed above or illustrated in FIGS. 7A–7B. For example, in accordance with one embodiment the step 570 is carried out between step 525 and step 530, and the confirmation number 64 (FIG. 3) is provided to the originator audibly prior to the step 530, whereby the confirmation method 240 of FIG. 4 is not necessary. As an additional example, in accordance with another embodiment of the present invention, the final delivery method 235 does not include steps 510–530, whereby the cover sheet 52 (FIG. 3) is created from information stored in memory 30 (FIG. 1) (e.g., signature reproduction 58 (FIG. 3)) that has been linked to the document control number 62 (FIG. 3) retrieved at step 545.

Figure 8:
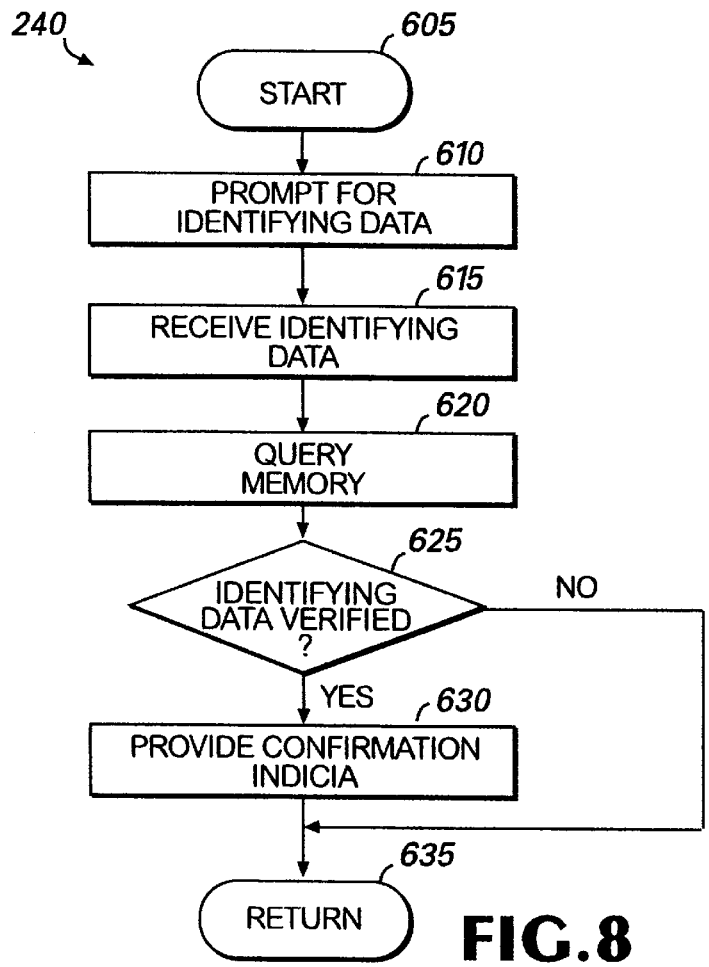
FIG. 8 is a flow diagram illustrating an exemplary method for confirming delivery of a certified facsimile message, which forms a part of the method of FIG. 4.

FIG. 8 is a flow diagram illustrating an exemplary method 240 for carrying out the confirmation step 240 of FIG. 4.

The confirmation method 240 begins at step 605 and proceeds to step 635. At step 610, the certifying system 10 (FIG. 1) prompts the originator for one or a plurality of identifying data, preferably including at least the document control number 62 (FIG. 3). At step 615, the certifying system 10 receives the identifying data from the originator. At step 620, the memory 30 is queried for identifying data previously stored in the memory 30. At step 625, the certifying system 10 compares the identifying data received at step 615 to the identifying data previously stored in the memory 30 to verify that the identifying data received at step 615 was previously stored in the memory 30. In response to a negative verification at step 625, the method 240 proceeds to step 635. In response to a positive verification at step 625, the method 240 proceeds to step 630. At step 630, the confirmation number 64 that was previously stored in memory 30 and linked to the identifying data received at step 610 is provided. The confirmation indicia can be acceptably provided by way of an audible message transmitted to a telephone set 22 (FIG. 1), or by way of a facsimile message transmitted to a facsimile machine 20 (FIG. 1). At step 635, the method 240 returns to step 245 (FIG. 4) of method 200 (FIG. 4)

Figure 9:
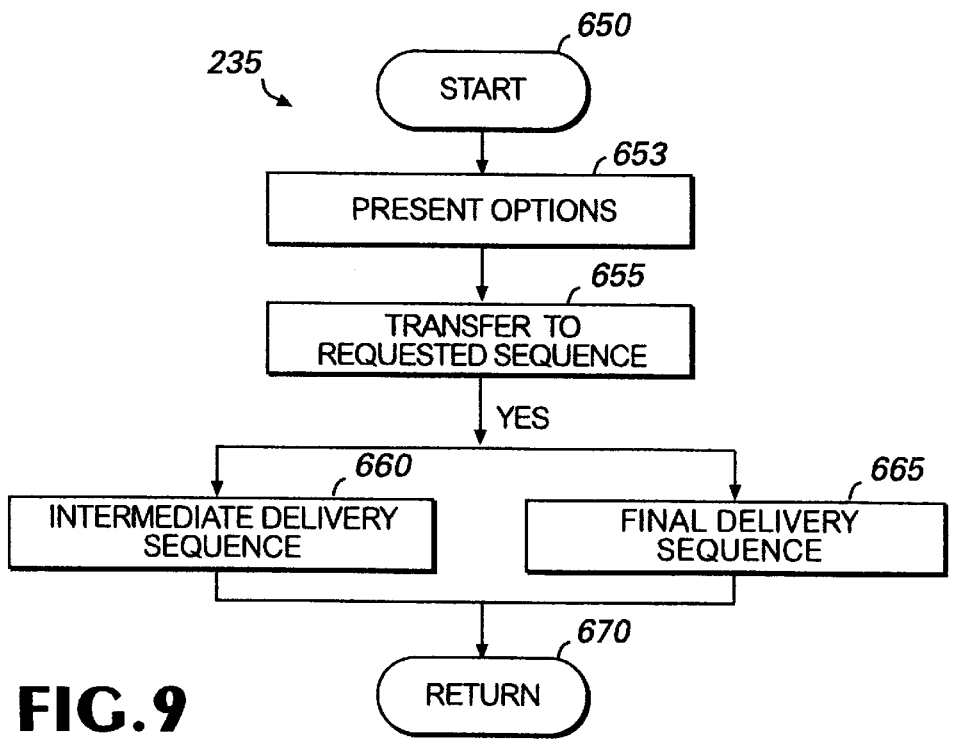
FIG. 9 is a flow diagram illustrating another exemplary method for completing a delivery of a certified facsimile message, which forms a part of the method of FIG. 4.

There are various methods for carrying out the present invention. For example, FIG. 9 illustrates an exemplary delivery method 235', in accordance with another embodiment of the present invention. The delivery method 235' can be substituted for the final delivery method 235 (FIGS. 4, 7A, and 7B). The delivery method 235' begins at step 650 and proceeds to step 670. At step 653 the certifying system 10 (FIG. 1) provides the originator with a plurality of options. At step 655, in response to the originator selecting one of the presented options, the method 235' proceeds to one of the steps 660,665. As discussed in greater detail below, at step 660 the certifying system 10 receives the facsimile message 54, and at step 665 the certifying system 10 transmits the certified facsimile message 50. Subsequent to each of the steps 660,665, the method 235' returns to step 245 (FIG. 4) of method 200 (FIG. 4).

Figure 10:
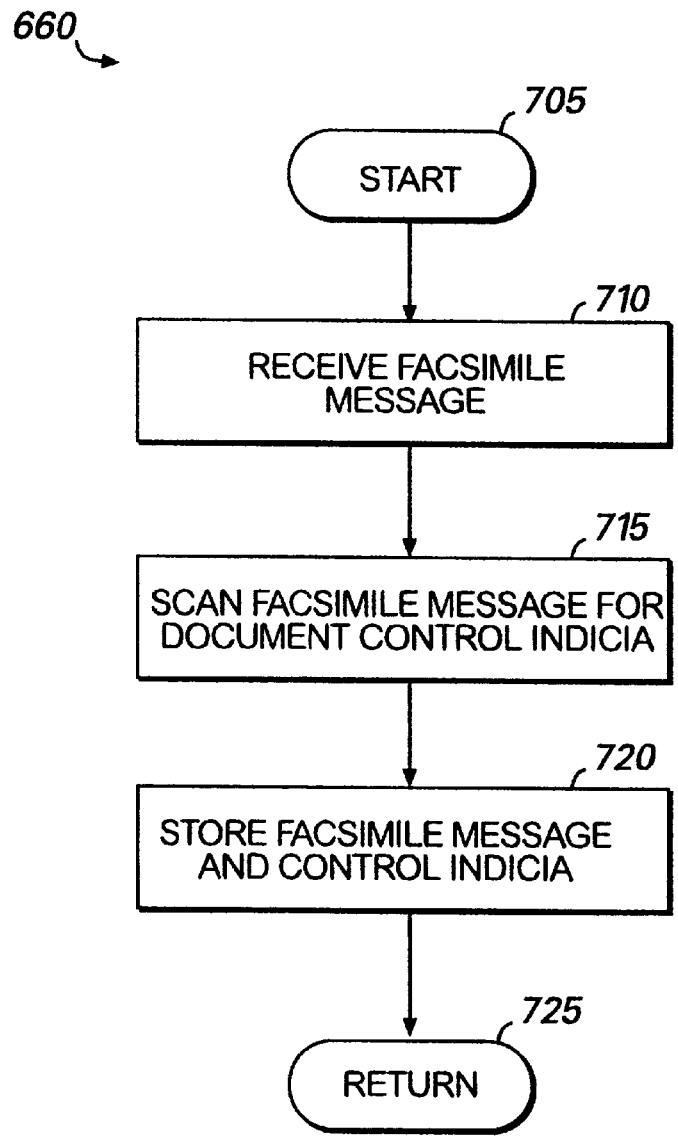
FIG. 10 is a flow diagram illustrating an exemplary method for further initiating a delivery of a certified facsimile message, which forms a part of the method of FIG. 9.

FIG. 10 is a flow diagram illustrating an exemplary method 660 of the intermediate delivery step 660 of FIG. 9. The intermediate delivery method 660 begins at step 705 and proceeds to step 710. At step 710, the certifying system 10 (FIG. 1) receives a facsimile message 54 (FIG. 3). At step 715, the certifying system 10 scans the facsimile message 54 and determines the document control number 62 associated with the facsimile message 54. At step 720, the facsimile message 54 and document control number 62 of step 715 are stored in memory 30 (FIG. 1) and linked to one another for retrieval purposes, as will be discussed in greater detail below. The method 660 returns to step 245 (FIG. 4) of method 200 by way of the step 725 and step 670 (FIG. 9).

Figure 11:
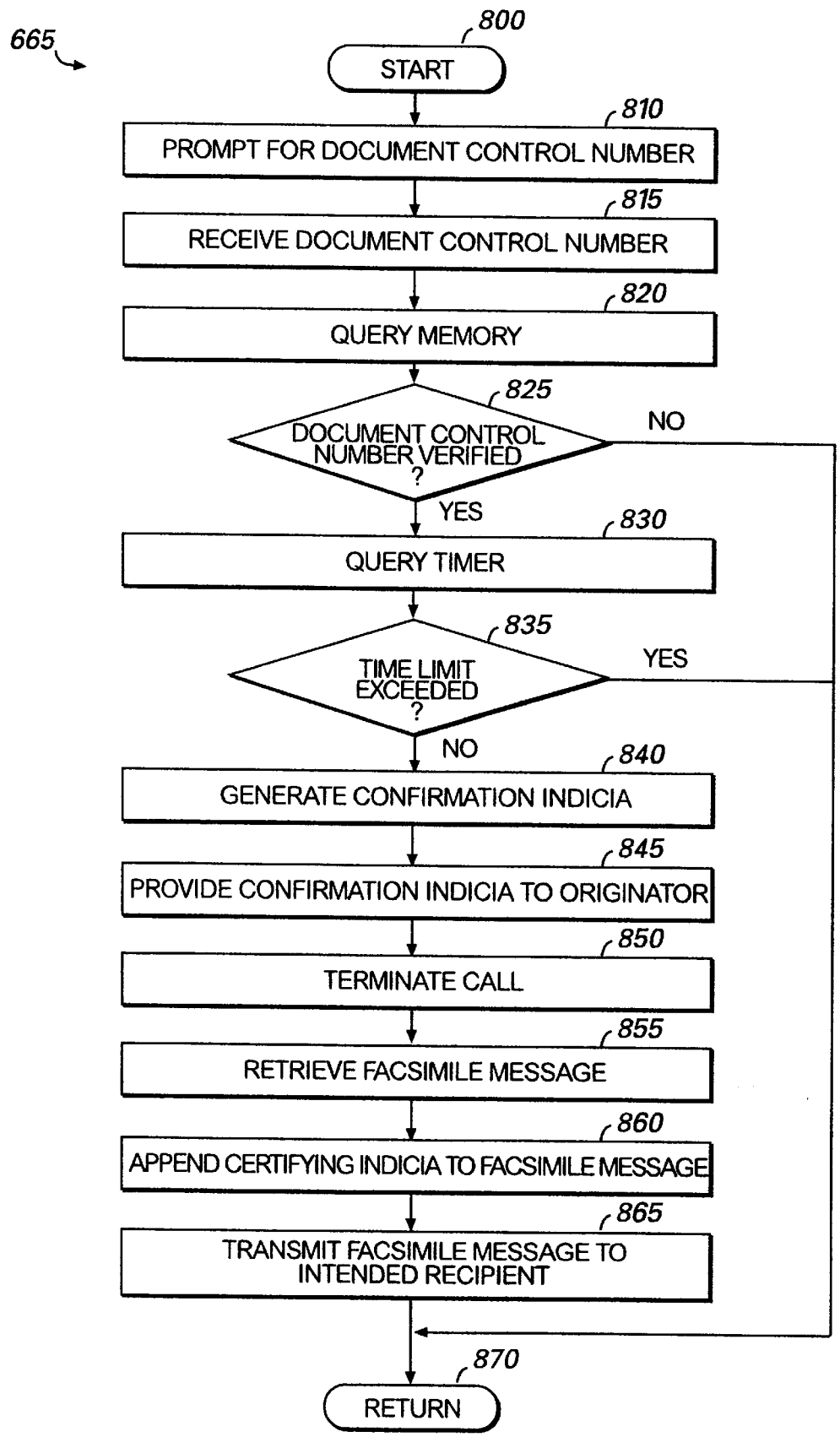
FIG. 11 is a flow diagram illustrating an exemplary method for completing a delivery of a certified facsimile message, which forms a part of the method of FIG. 9.

FIG. 11 is a flow diagram illustrating an exemplary method 665 of the final delivery step 665 of FIG. 9. The final delivery method 665 begins at step 800 and proceeds to step 810. At step 810, the certifying system 10 prompts for a document control number 62 (FIG. 3) that was generated by one of the methods discussed with respect to the initial delivery step 230 (FIGS. 4 and 6). A document control number 62 is received at step 815. At step 820, the memory 30 is queried for document control numbers 62 previously stored in the memory 30. At step 420, the certifying system 10 compares the document control number 62 received at step 815 to the document control numbers 62 previously stored in the memory 30 to verify that the document control number 62 received at step 815 was previously stored in the memory 30. In response to a negative verification at step 825, the method 665 proceeds to step 870. In response to a positive verification at step 825, the method 665 proceeds to step 830.

At step 830, the timer that was started at step 445 (FIG. 6) is queried to determine the amount of time that has elapsed since the document control number 62 provided at step 815 was generated at step 425 (FIG. 6). If the pre-established time limit for the document control number 62 has expired, the method 665 proceeds to step 870. If the time limit has not expired, the method 665 proceeds to step 840. The certifying system 10 generates the confirmation number 64 (FIG. 3) at step 840 and provides the confirmation number 64 to the originator by way of any of the methods discussed above. The call is terminated at step 850. At step 855, the facsimile message 54 (FIG. 3) that corresponds to the document control number 62 received at step 815 is retrieved from storage and the cover sheet 52 (FIG. 3) is generated and appended to the retrieved facsimile message 54 at step 860 to create the certified facsimile message 50 (FIG. 3). The signature reproduction 58 included in the cover sheet 52 was previously linked to the document control number 62 retrieved at step 815. The certified facsimile message 50 is transmitted to the receiver at step 865. If the receiver can not be reached, step 865 is repeated in an effort to reach the receiver. The method 665 returns to step 245 (FIG. 4) of method 200 by way of the step 725 and step 670 (FIG. 9).

Throughout the above-described steps and methods, unless expressly indicated otherwise, data and instructions can be provided to the certifying system 10 by way of touch-tone entry (e.g., push-button dialing at a telephone 22 or facsimile machine 20) or verbally (i.e., by speaking into a telephone 22 or facsimile machine 20).

Those skilled in the art will appreciate that computer code can be written and then executed by the processing unit 26 (FIG. 1) to carry out the above-described steps and methods. Additionally, as should be understood by those skilled in the art, if any expected input is not received by the certifying system 10 (FIG. 1) during any one of the above described methods, the method would be terminated.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

I claim:

1. A method for certifying facsimile communication over a telephone network between an originator of a facsimile message and a receiver of the facsimile message, comprising the steps of:

performing a first sequence, comprising the steps of:
receiving an identifying data and a certifying indicia from the originator;
storing the certifying indicia in a memory;
identifying the originator based on the identifying data; and
generating a document control indicia, storing the document control indicia in the memory and providing the document control indicia to the originator in response to positively identifying the originator; and performing a second sequence, subsequent to the first sequence, the second sequence comprising the steps of:
receiving a first facsimile transmission message and the document control indicia from the originator;
identifying the originator of the first facsimile transmission message by comparing the document control indicia received from the originator with the document control indicia stored in the memory;
in response to identifying the originator of the first facsimile message, retrieving from the memory the certifying indicia that corresponds to the originator;
transmitting to the receiver the first facsimile transmission message plus the certifying indicia retrieved from the memory; and
generating a confirmation indicia originally unknown to both the originator and the receiver and providing the confirmation indicia to the originator and the receiver to authenticate the first facsimile transmission message.

2. The method of claim 1, wherein the certifying indicia is a reproduction of the handwritten signature of the originator, whereby the receiver can compare the reproduction of the handwritten signature to a handwritten signature original on the first facsimile message for authentication purposes.

3. The method of claim 1, wherein the step of transmitting includes the steps of
appending the certifying indicia to the first facsimile message to create a second facsimile message, and
transmitting the second facsimile message to the receiver.

4. A method for certifying facsimile communications over a telephone network between a plurality of originators of facsimile messages and at least one receiver of facsimile messages, comprising the steps of:

performing a first sequence, comprising the step of providing in a memory a plurality of identifying data and a plurality of certifying indicia, wherein the certifying indicia are received from the originators and each certifying indicia is linked to at least one of the plurality of identifying data and identifies at least one of the originators of facsimile messages; and performing a second sequence subsequent to the first sequence, the second sequence comprising the steps of:
receiving identifying data from a first one of the originators;
receiving a first facsimile message from the first originator;
identifying the first originator by verifying that the identifying data received from the first originator corresponds to at least one of the plurality of identifying data in the memory;
responsive to positive verification during the verifying step, performing the steps of;
retrieving from the memory the certifying indicia that is linked to the identifying data received from the first originator;
transmitting the first facsimile message and the retrieved certifying indicia to the receiver;
generating a confirmation indicia originally unknown to both the first originator and the receiver and providing the confirmation indicia to the first originator and the receiver to authenticate the facsimile message.

5. The method of claim 4, wherein the certifying indicia is a reproduction of the handwritten signature of the originator, whereby the receiver can compare the reproduction of the handwritten signature to a handwritten signature original on the facsimile message for authentication purposes.

6. The method of claim 4,
wherein the identifying data includes a document control indicia,
wherein the plurality of identifying data includes the document control indicia, and
wherein the step of receiving identifying data includes the step of extracting the document control indicia from the facsimile message.

7. The method of claim 4, wherein the step of providing a plurality of certifying indicia includes the steps of
receiving a first facsimile message,
extracting the certifying indicia from the first facsimile message, and
storing the certifying indicia in the memory.

8. A method for certifying facsimile communications over a telephone network between a plurality of originators of facsimile messages and at least one receiver of facsimile messages, comprising the steps of:

performing a first sequence comprising the step of;
providing in a memory a plurality of identifying data and a plurality of certifying indicia, wherein each certifying indicia is linked to at least one of the plurality of identifying data and identifies one of the originators of facsimile messages; and performing a second sequence subsequent to the first sequence, the second sequence comprising the steps of:
receiving from a first one of the originators a first transmission including identifying data;
verifying that the identifying data received from the first originator corresponds to at least one of the plurality of identifying data,
responsive to positive verification that the identifying data corresponds to at least one of the plurality of identifying data, storing a document control indicia in the memory and linking the document control indicia to the certifying indicia that identifies the first originator;
receiving from the first originator a second transmission including the document control indicia and a facsimile message;
retrieving the certifying indicia that is linked to the document control indicia;
transmitting the facsimile message and the certifying indicia that is linked to the document control indicia, to the receiver
generating a confirmation indicia originally unknown to both the first originator and the receiver and providing the confirmation indicia to the first originator and the receiver to authenticate the facsimile message.

9. The method of claim 8, further comprising the step of extracting the document control indicia from facsimile message of the second transmission.

10. The method of claim 8, further comprising the step of establishing a time limit for the document control indicia such that the step of receiving from the first originator a second transmission must be carried out within a limited period of time after the step of storing the document control indicia.

11. The method of claim 8, further comprising the steps of:

generating a confirmation indicia that is originally unknown to the receiver and the first originator;

making the confirmation indicia available to the receiver; and making the confirmation indicia available to the first originator, whereby the receiver can utilize the confirmation indicia for authentication purposes.

12. The method of claim 8, further comprising a step of appending the certifying indicia to the facsimile message, wherein the step of transmitting includes the step of transmitting the facsimile message, with the certifying indicia appended thereto, to the receiver.

13. The method of claim 12, wherein the certifying indicia is a reproduction of the handwritten signature of the originator, whereby the reproduction of the handwritten signature is appended to the facsimile message and can be compared to a handwritten signature original on the facsimile message for authentication purposes.

14. A method for certifying facsimile communications over a telephone network between an originator of a facsimile message and a receiver of the facsimile message, comprising the steps of:

storing in a memory at a certifying center an identifying data and a certifying indicia that correspond to the originator;

performing a first sequence, comprising the steps of:

transmitting the identifying data from the originator to the certifying center;

identifying the originator at the certifying center by comparing the identifying data transmitted by the originator with the identifying data stored in memory that corresponds to the originator; and in response to positive identification of the originator, transmitting a first facsimile transmission message from the certifying center to the originator, wherein the first facsimile transmission message contains a document control indicia;

linking the document control indicia to the certifying indicia stored in the memory;

performing a second sequence subsequent to the first sequence, the second sequence comprising the steps of:

transmitting from the originator a second facsimile transmission message plus the certifying indicia and the document control indicia to the certifying center;

verifying the originator of the second facsimile message at the certifying center by comparing the certifying indicia with the certifying indicia stored in the memory and comparing the document control indicia transmitted by the originator with the document control indicia linked to the certifying indicia stored in the memory;

in response to verifying the originator of the second facsimile message, retrieving the certifying indicia stored in the memory that corresponds to the originator;

transmitting from the certifying center to the receiver the second facsimile transmission message, and the retrieved certifying indicia; and generating a confirmation indicia originally unknown to both the first originator and the receiver and providing the confirmation indicia to the first originator and the receiver to authenticate the second facsimile transmission message.

15. The method of claim 14, wherein the identifying data is selected from the group comprising a personal identification number, a password, or a voice print.

16. The method of claim 14, wherein the certifying indicia is a reproduction of the handwritten signature of the originator, whereby the receiver can compare the reproduction of the handwritten signature to a handwritten signature original on the second facsimile message used to authenticate the second facsimile transmission message.

* * * * *